(12) United States Patent
Balaschak et al.

(10) Patent No.: US 7,473,086 B2
(45) Date of Patent: Jan. 6, 2009

(54) POROUS MOLD INSERT AND MOLDS

(75) Inventors: Edward James Balaschak, Avon, OH (US); Michael Czenszak, Cleveland Heights, OH (US); Douglas Seredich, Monteville, OH (US)

(73) Assignee: General Electric Company, Schenectady, NY (US)

( * ) Notice: Subject to any disclaimer, the term of this patent is extended or adjusted under 35 U.S.C. 154(b) by 806 days.

(21) Appl. No.: 11/001,220

(22) Filed: Dec. 1, 2004

(65) Prior Publication Data

US 2006/0113711 A1    Jun. 1, 2006

(51) Int. Cl.
*B29C 45/20*    (2006.01)
*B29C 45/83*    (2006.01)

(52) U.S. Cl. .......................... 425/97; 425/567; 425/573

(58) Field of Classification Search .................. 425/96, 425/97, 98, 573, 567, 569, 90
See application file for complete search history.

(56) References Cited

U.S. PATENT DOCUMENTS

| | | | | |
|---|---|---|---|---|
| 3,555,619 | A * | 1/1971 | Bucy | 425/154 |
| 4,009,978 | A * | 3/1977 | Hanning | 425/98 |
| 4,895,503 | A * | 1/1990 | Proska et al. | 425/127 |
| 6,042,361 | A * | 3/2000 | Murphy | 425/546 |
| 6,137,229 | A | 10/2000 | Nishiura et al. | |
| 6,456,005 | B1 | 9/2002 | Panchula et al. | |
| 6,538,377 | B1 | 3/2003 | Scott et al. | |
| 6,563,265 | B1 | 5/2003 | Sivaraman et al. | |
| 6,583,563 | B1 | 6/2003 | Venkataramani et al. | |
| 7,021,923 | B2 * | 4/2006 | Adams et al. | 425/567 |
| 2002/0003319 | A1 * | 1/2002 | Story et al. | 264/335 |
| 2004/0113557 | A1 * | 6/2004 | Scott et al. | 313/634 |

FOREIGN PATENT DOCUMENTS

| | | | |
|---|---|---|---|
| DE | 24 09 771 A1 | | 9/1975 |
| DE | 196 07 449 A1 | | 9/1997 |
| JP | 06143296 A | * | 5/1994 |
| JP | 07223242 A | * | 8/1995 |
| SU | 1147583 A | * | 3/1985 |
| WO | WO 02/43942 A1 | | 6/2002 |
| WO | WO 02/071442 A1 | * | 9/2002 |

OTHER PUBLICATIONS

J. Harry DuBois, Plastics Mold Engineering Handbook, Third edition, Van Nostrand Reinhold Company, 1978, pp. 309-321, especially pp. 320 and 321.*

Partial machine translation of JP06-143296A dated May 1994 obtained from the JPO website.*

* cited by examiner

*Primary Examiner*—Robert B Davis
(74) *Attorney, Agent, or Firm*—Pearne & Gordon LLP (57) ABSTRACT

A mold is provided having a porous metal insert through which a mold release agent can be pumped to provide a desired, precisely metered quantity or coating of the release agent at a desired location along the inner surface of a mold cavity, or at the inner surface of an injection port, between or at periodic intervals of successive moldings of parts. The need to manually apply mold release agent between successive moldings, for example to the injection port of an injection mold, is reduced, thereby reducing or substantially eliminating inconsistent applications of release agent that are characteristic of manually applied coatings. A method of molding using the disclosed porous metal insert also is provided.

24 Claims, 4 Drawing Sheets

POROUS MOLD INSERT AND MOLDS

FIELD OF INVENTION

The present invention relates generally to molds and to methods of molding for making, e.g., ceramic parts. More particularly, it relates to a mold insert and a method for effectively and reproducibly delivering metered quantities of mold release agent to desired locations along a molding cavity surface or an injection port for a mold.

BACKGROUND OF THE INVENTION

Methods of molding generally are well known. Conventionally, a molded part is made by providing, e.g. via injection, pouring or other suitable or conventional means, an uncured molding compound into a molding cavity whose shape and surface contour conform to the desired shape of a finished molded product. As supplied to the mold, the molding compound generally is in liquid form so that it can flow and conform to the shape, and fill the volume of, the molding cavity. The molding compound then is caused or permitted to cure or harden or solidify, thus producing a greenware solid part conforming to the shape and contour of the molding cavity. The greenware part is demolded, and often is subjected to some subsequent treatment, such as a heat treatment, to impart additional strength to the part prior to use. Alternatively, for some molding compounds the demolded greenware part immediately is ready or suitable for use without any subsequent treatment.

By way of example, molding compounds of interest include ceramic compounds, and particularly alumina compounds. In one conventional operation, a mold for a ceramic part includes two mold halves wherein each half includes a respective molding cavity half. During a molding operation, the mold halves are adapted to be joined together or brought into contact such that the molding cavity halves provided respectively therein cooperate to form a substantially continuous molding cavity having a seam defining the perimeter of the cavity adjacent the line of contact between the cavity surfaces of the respective molding cavity halves. An injection port can be provided in either or both of the mold halves in order to deliver the molding compound into the molding cavity once the halves have been joined. Alternatively or additionally, each mold half can be provided with a respective runner in the form of a groove in the facing surface of each mold half (the surface that will mate or join the corresponding surface of the opposing mold half to provide the complete molding cavity during a molding operation), such that when the mold halves are joined (facing surfaces brought into contact) the respective runners cooperate to define a complete injection port to deliver ceramic molding compound into the molding cavity.

Unfortunately, it is not uncommon for injection ports or for the runners that define an injection port to become clogged or backed up with a residue of the molding compound. Often it is necessary for an operator manually to apply a mold release agent such as a silicone agent to the runners, or otherwise to flush the injection ports with such an agent, between molding operations in order to ensure the injection ports are free of debris. A significant problem associated with this is that different operators can employ relatively inconsistent techniques for applying the mold release agent to the runners, or, flushing the injection ports. This can result in inconsistent and unpredictable amounts of mold release agent being applied between successive runs for making molded parts. Too little release agent can result in improper or impeded injection of molding compound due to blockage; too much can damage or ruin batches of subsequently molded parts.

In addition, molds for some parts have regions of highly intricate surfaces where mold release often is a problem. It is usual for an operator to apply to such regions a quantity of mold release agent between successive runs of making the molded parts in order to facilitate effective release from such regions. However, here too the quantity, as well as the layer thickness, of mold release agent can be highly variable and unpredictable depending on the operator's technique, leading to inconsistent application of mold release agent and unpredictable results between successive runs.

There is a need in the art for an apparatus and method effective to reproducibly apply a metered quantity of a mold release agent at desired locations along a molding surface, and particularly at the injection ports.

BRIEF SUMMARY OF THE INVENTION

A mold is provided that has a molding cavity defined within the mold, an injection port having an inner surface defining a passageway through a wall of the mold for injecting a molding compound into the molding cavity, and a porous metal insert provided in the wall of the mold. A portion of the porous metal insert is located at and provides at least a portion of the inner surface of the injection port.

A method of molding an article also is provided, which includes the following steps: a) providing a mold having a molding cavity defined within the mold, an injection port having an inner surface defining a passageway through a wall of the mold for injecting a molding compound into the molding cavity, and a porous metal insert provided in the wall of the mold, wherein a portion of the porous metal insert is located at and provides at least a portion of the inner surface of the injection port; and b) pumping a mold release agent through the porous metal insert to provide a coating of the mold release agent on the inner surface of the injection port.

A further method of molding an article also is provided having the following steps: a) providing a mold having a molding cavity having an inner surface defined within the mold, and a porous metal insert provided in a wall of the mold, wherein an inner surface portion of the porous metal insert is located at and conforms to the contour of the inner surface of the molding cavity to provide a substantially continuous portion thereof; and b) pumping a mold release agent through the porous metal insert to provide a coating of the mold release agent on the inner surface portion of the porous metal insert.

A mold also is provided for an end portion of a ceramic arc tube for a discharge lamp. The mold has reciprocating first and second mold halves, wherein the mold halves have: respective and opposing first and second facing surfaces that face the opposing mold half in a closed position of the first and second mold halves, respective and opposing first and second injection runners provided in the respective first and second facing surfaces that extend in a substantially longitudinal direction from an outer surface of the respective mold half, respective and opposing first and second laterally extending runners provided in the respective first and second facing surfaces, wherein each of the first and second injection runners extends to and is in fluid communication with the associated laterally extending runner, further wherein each of the laterally extending runners extends laterally in either direction from the associated injection runner toward respective and opposing first and second pairs of laterally disposed and longitudinally extending molding cavity halves. In the closed position of the first and second mold halves, the first and second injection runners cooperate to define an injection port through a wall of the mold, the first and second laterally extending runners cooperate to define a laterally extending channel in fluid communication with the injection port, and the first pair of molding cavity halves cooperate with the second pair of molding cavity halves to define a pair of complete molding cavities located on either said of and in fluid communication with the laterally extending channel. A porous metal insert is provided in a wall of the first mold half, wherein the porous metal insert has an inner surface portion located at the first facing surface. At least a portion of the first runner is provided in the inner surface portion of the porous metal insert.

DETAILED DESCRIPTION OF PREFERRED EMBODIMENTS OF THE INVENTION

As used herein, where a range such as "5-25" or "5 to 25" is given, this means preferably at least 5 and separately and independently, preferably not more than 25. Also as used herein, a wall of a mold (or of a mold half) refers to the solid portion of the mold (or mold half) between an exterior surface of the mold (or mold half) on one side and an inner surface of a molding cavity (or cavity half) on the other side. Also, a greenware part is a part as-formed by molding in a mold as described herein, immediately after the part has been formed or demolded, and prior to any subsequent treatment to further cure or otherwise impart strength to the part.

The present invention presents an improvement to methods of molding, particularly injection molding, as well as to the molds used in such operations. An injection mold has and defines a molding cavity therein for molding a desired part, and an injection port. The injection port has an inner surface that defines a passageway through the mold wall for injecting a molding compound into the molding cavity from outside of the mold. According to one embodiment of the invention, a porous metal insert is provided in the mold wall, with at least a portion of the insert located at and providing or defining a portion of the inner surface of the injection port. During or prior to a molding operation, mold release agent can be provided to the inner surface of the injection port by pumping, via automated means, a precisely metered quantity of the release agent directly through the porous network of the metal insert so that the release agent is secreted at the inner surface of the injection port. In this manner, a precisely metered and reproducible film or coating of mold release agent is provided at the inner surface of the injection port, and is effective to minimize or substantially eliminate clogging of the port with uncured, cured or partially cured molding compound while maintaining consistent quality of the successively molded parts.

The invention has substantial utility for high volume molded parts where it is desirable to successively mold parts in the same mold at a relatively high cyclic rate, because it can eliminate the need for operator intervention between successive molding cycles which otherwise may be necessary to clear the injection port. Also, as already indicated the mold release agent can be delivered to the injection port surface in very precise, machine-metered and reproducible quantities thus resulting in a very uniform process that does not suffer from the drawback of inconsistent mold release agent application more characteristic of a manually applied coating. In essence, because at least a portion of the inner surface of the injection port serves as a delivery conduit for the direct application (secretion) of mold release agent, it no longer is necessary to manually wipe on the release agent between successive injections of molding compound. Instead, automated means such as a metering pump, syringe pump, etc., can measure and deliver precisely metered quantities of mold release agent to the metal insert, for example via tubing coupled to the insert as explained below, such that the release agent is pumped directly through the porous structure of the insert to provide a consistently reproducible coating of release agent at the inner surface of the injection port.

Additional features will become apparent to the person of ordinary skill in the art on reading the following description of exemplary embodiments of the invention, which are provided by way of illustration and not limitation.

Figure 1:
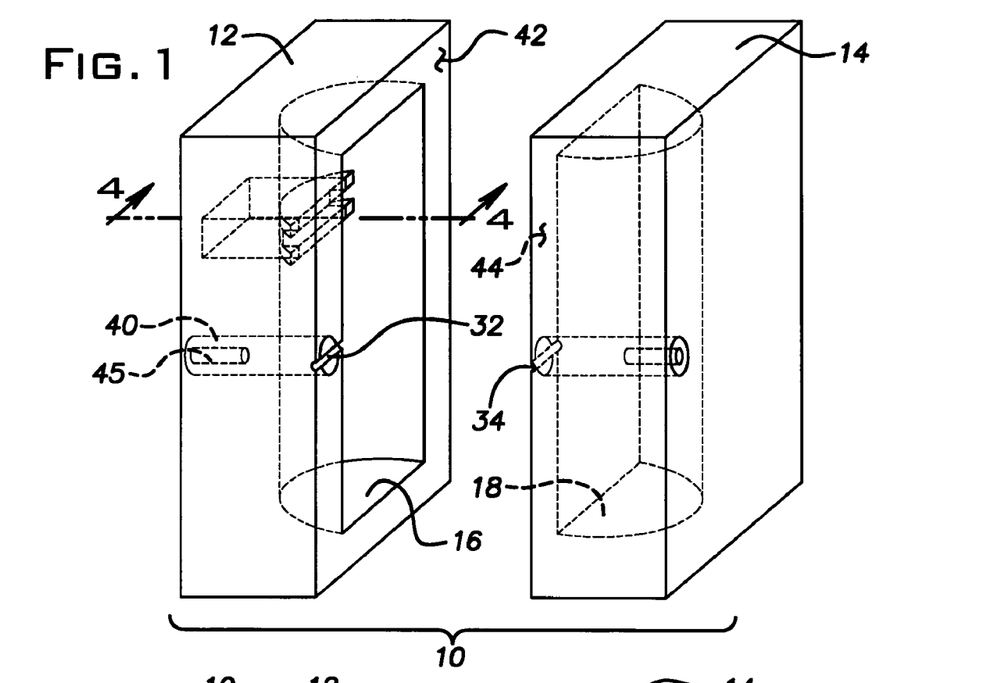
FIG. 1 shows opposing first and second mold halves for a generic molded part in an opened position, wherein each mold half is provided with a porous metal insert according to the invention.
Figure 2:
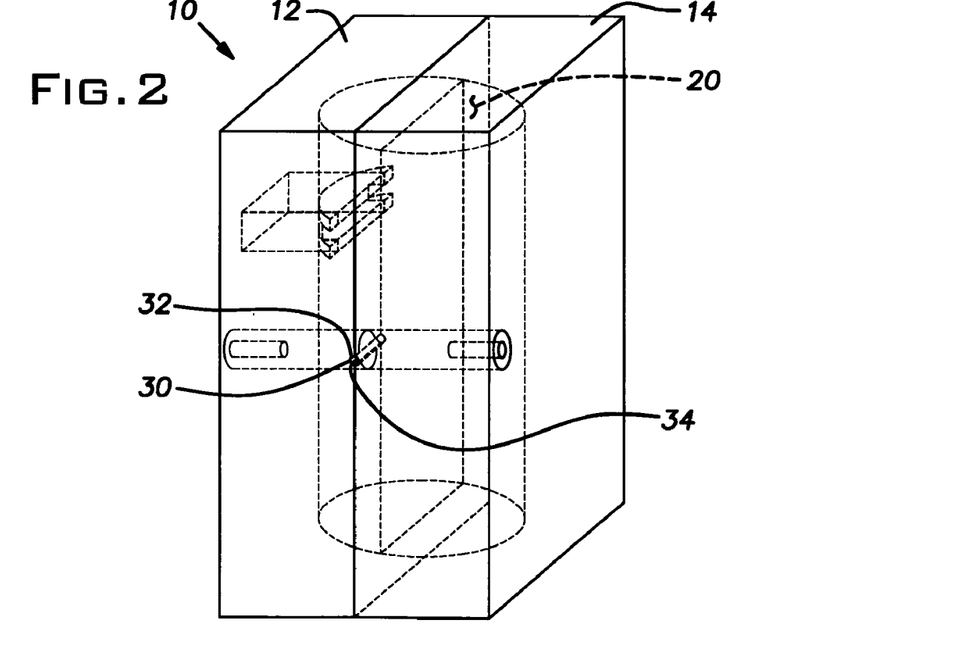
FIG. 2 shows the opposing first and second mold halves of FIG. 1, but in a closed position such that a substantially continuous molding cavity is defined by and between respective molding cavity halves located in the first and second mold halves.
Figure 3:
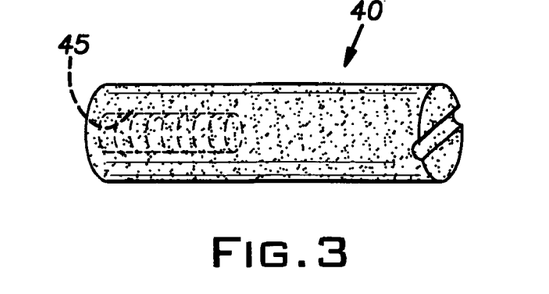
FIG. 3 shows a close-up view of the porous metal insert of the left-hand mold half of FIG. 1, apart from the mold half.

Referring first to FIG. 1, an injection mold 10 is illustrated. The mold 10 includes a pair of opposing first and second mold halves 12 and 14 which are shown in an open position in FIG. 1. Each of the mold halves 12 and 14 has a facing surface 42,44, defined as that surface that faces the opposing mold half in the closed position as shown in FIG. 2. The mold halves 12 and 14 have provided therein respective and opposing first and second molding cavity halves 16 and 18 which are open to the associated facing surface 42 or 44. The molding cavity halves 16 and 18 are provided such that when the mold halves 12 and 14 are joined or brought together in the closed position, FIG. 2, the opposing cavity halves 16 and 18 cooperate to provide and define a substantially continuous molding cavity 20 whose inner surface shape and contour conform to the exterior dimensions of a desired molded part. It is to be noted that for simplicity of illustration, except for the sticking surface region 50 (described below) the molding cavity halves 16 and 18 are illustrated generically in the figures as semi-cylindrical cavities, wherein when joined together the thusly defined molding cavity 20 is substantially a cylinder. However, it will be understood by persons of ordinary skill in the art that the invention as herein described can be applied and adapted for use with a mold having any suitable or desirable dimensions, including those of the respective molding cavity halves 16 and 18, and the invention is not limited to any particularly shaped mold halves or molding cavity halves.

The first and second mold halves 12 and 14 have respective and opposing first and second injection runners 32 and 34 provided generally as conduits or grooves in the facing surfaces 42 and 44, and extending between the associated molding cavity half 16 or 18 at one end and an outer surface of the respective mold half 12 or 14 at the other. The injection runners 32 and 34 are aligned and oriented relative to one another such that in the closed position of the mold halves 12 and 14, the runners cooperate to define an injection port 30 extending through the mold wall (defined by the closed mold halves 12 and 14) and providing fluid communication between the molding cavity 20 within the mold and an exterior of the mold. In practice, a molding compound such as a ceramic molding compound comprising, e.g. silica, alumina and/or other ceramics with or without binders, curing agents, fillers, etc., is injected into the molding cavity 20 through the injection port 30 in order to deliver or provide the molding compound therein to mold a desired part.

A porous metal insert according to the invention now will be described with respect to only the first mold half 12, provided in conjunction with the first injection runner 32. However, it will be understood that the second mold half 14 also is or can be provided with a similar porous metal insert to augment the second injection runner 34 as hereafter described, except that the insert provided for the second runner 34 will be the mirror image of that provided for the first runner 32. It is to be noted, however, that it is not considered necessary or essential to the present invention that a porous metal insert as hereafter described be provided in conjunction with both the first and the second injection runners 32 and 34; though in a desirable embodiment, both runners are so provided.

Referring again to FIG. 1, a porous metal insert 40 is provided in a wall of the first mold half 12. The insert 40 has an inner surface portion that is located at, and preferably forms a substantially continuous portion of, the facing surface 42 at the location of the first injection runner 32 in that surface. The porous metal insert 40 extends from its inner surface portion at least partially through the wall of the mold half 12. In the illustrated embodiment, the insert 40 extends from its inner surface portion at the location of the first injection runner 32 to a location at or adjacent an outer surface of the mold half 12. The porous metal insert 40 is machined at its end located at the facing surface 42 to conform to that surface and also to conform to and provide at least a portion of the first runner 32 therein. In other words, the first injection runner 32 is provided as a conduit or groove in the first facing surface 42 that extends from an outer surface to the molding cavity half 16, wherein the porous metal insert 40 forms or provides at least a portion of the facing surface 42 in which the first runner 32 is provided.

The porous metal insert 40 comprises or is made from a metallic material, such as tool steel, having or that has been provided with a porous network. By porous network, it is meant that the porous metal insert 40 is a substantially porous solid having a void fraction of about or at least 5, 10, 15, 20 or 25, percent, meaning that about or at least that proportion of the volume of the porous metal insert 40 is or constitutes void space. The porous network includes a system of interconnected pores through the solid material such that a liquid or gas can be pumped or driven through the porous metal insert 40 via the porous network given adequate pressure. During operation, a precisely metered quantity of mold release agent, such as a silicone containing agent or material, can be pumped directly through the porous metal insert 40 between successive moldings or at periodic intervals of moldings in order to inhibit or reduce or prevent the build up of molding compound in the runners 32,34, or in the injection port 30 defined by them.

The porous metal insert 40 can be drilled and tapped to provide a threaded blind bore 45 (for example in the configuration of a female pipe fitting) directly in the insert 40. In this manner, tubing can be provided with a complementarily threaded male fitting (not shown) and fitted directly to the insert 40 for delivery of the mold release agent. A pump or other suitable equipment can be used for delivering the mold release agent through the tubing and into and through the porous network of the metal insert 40 to provide or secrete a coating of release agent on the inner surface of the injection port 30 between successive moldings of parts, or if desired at periodic intervals of molded parts. It is contemplated that some degree of routine experimentation may be desirable for a particular molding operation (e.g. using a particular molding compound, particular injection port diameter, etc.) to determine the optimal interval and quantity for providing the mold release agent. By the present invention it now is possible to deliver a reproducible and precisely machine-metered (e.g. using suitable pumps) quantity of mold release agent directly to the inner surface of an injection port 30 of a mold to prevent or inhibit build up of the molding compound.

A particularly suitable material for the porous metal insert 40 is sold under the tradename Porcerax II® and is available from International Mold Steel, Inc., Florence, Ky. Porcerax II® is a sintered, porous metal having a porosity (void fraction) in the range of 20 to 30 percent by volume, and is available having pores with average pore diameters of about 3, 7 or 20 microns. Porcerax II® is available in round bars of $3/8$, $1/2$, $5/8$, $3/4$ and 1 inch diameters, all of 6 inches length. The 7 and 20 micron pore sizes also are available in rectangular blocks of 8×12×27 inches. The material can be cut or machined from these as-supplied dimensions to achieve proper shape and size for a particular application as described in the following paragraph.

Porcerax II® has proven to be an excellent material for use in the present invention, as it has good machinability and can be provided in virtually any desired shape or configuration. When machining Porcerax II®, it is preferred to machine via electric discharge machining (EDM) methods, which are well known in the art, in order to avoid closing up the porosity of the material at the machining surface. EDM avoids this result because it removes material essentially by vaporizing or ionizing material on introduction of a high intensity electric discharge, and does not grind material as with mechanical machining methods. Therefore, EDM results in the removal of material, thus exposing the underlying porous material and does not affect the porosity of the thusly exposed material. Conversely, mechanical machining methods essentially grind away material which tends to close up the pores of the newly or freshly exposed material surface. If mechanical machining methods are to be used, the porosity of the machined material can be re-established using EDM techniques to burn away metal material that has been crushed at the surface and thereby blocked the pore structure. The manufacturer recommends using cutting oils when machining by mechanical methods. Also, once an insert is machined into the desired shape from the supplied stock, the manufacturer recommends EDM at the machined surfaces to reestablish the surface porosity, heating in an oven for 2-3 hours at about 350° F., followed by sonicating in acetone to clear the cutting oils from the porous network. This should be followed by blowing dry using high pressure air supplied, e.g., through a fitting coupled to the tapped bore 45.

The porous metal insert 40 is shown in the drawings as a substantially cylindrical piece. It will be understood, however, that this shape is not required in the present invention. A cylindrical shape is desirable in certain applications for simplicity, because it is relatively straightforward to provide a cylindrical hole or bore through the mold wall (such as mold half 12) by drilling, to accommodate the insert 40 therein. Nonetheless, the metal insert 40 can be provided in other shapes (for example an elbow) where desirable or otherwise required, for example to accommodate the geometry of a particular mold, and the invention is not limited to any particular shape of the porous metal insert 40. All that is important is that the insert 40 be provided at a location in a mold, such as at an injection port 30 (or a runner 32,34 for an injection port to be defined between opposing mold halves 12,14), where it is desirable periodically to provide a reproducible and precisely metered quantity of mold release agent.

Figure 4:
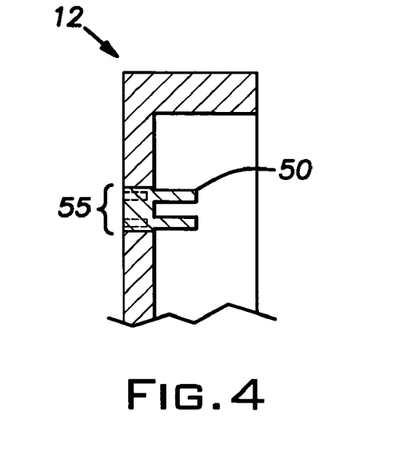
FIG. 4 shows a cross-section of the left-hand mold half of FIG. 1 taken along line 4-4.

Referring now to FIGS. 1 and 4, an exemplary sticking surface region 50 is shown along the inner surface of the first molding cavity half 16 provided in the first mold half 12. The sticking surface region 50 is depicted generically as comprising a pair of inwardly extending fin-like protrusions, but it will be understood by those having ordinary skill in the art that the invention is not correspondingly limited to any particular surface structure or contour. All that is intended is to indicate a region along the inner surface of the molding cavity 20 where for some reason, commonly due to the intricacy of the surface contour, sharp angles in surface contour, or sometimes the sheer expanse of the surface, a molded part tends to stick to the molding cavity surface after the molding compound has been cured or hardened, such that demolding becomes difficult without damaging or destroying the molded part.

In FIG. 4, a porous metal insert 55 is provided in the wall of mold half 12, having an inner surface portion whose surface contour cooperates and is substantially continuous with the inner surface of the cavity 20, and that forms at least a portion of the sticking surface region 50. In the illustrated embodiment, the insert 55 is drilled and tapped to provide at least one blind bore having female threads adapted to couple to a threaded male fitting to deliver precisely metered quantities of mold release agent to the sticking surface region 50 at desirable intervals, similarly as explained above. Of course, it will be understood that the sticking surface region 50 need not be provided entirely by such a porous metal insert 55, but a portion or portions of it can be so provided as may be desirable for a particular application or surface region for a particular mold.

Figure 5:
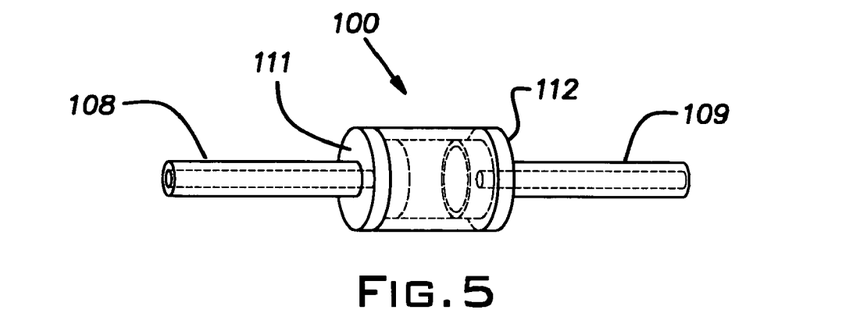
FIG. 5 shows a ceramic arc tube having end portions made according to a method of the present invention.

Referring now to FIGS. 5-10, the invention will be further described with respect to a particular application where the porous metal insert of the present invention has been found to perform desirably. Pictured in FIG. 5 is a ceramic arc tube 100 which generally is known in the art, and forms part of a conventional ceramic metal halide arc discharge lamp. Briefly, these lamps produce light by ionizing a filler material, such as a mixture of metal halides and mercury, disposed within the arc tube 100 by passing an arc through the filler material between two electrodes located at opposite ends of the arc tube 100. The arc tube 100 contains and maintains the pressure of the energized filler material and allows the emitted light to pass through it. Conventionally, the arc tube 100 is provided as a substantially cylindrical, hollow body having first and second leg portions 108 and 109 longitudinally and concentrically extending from respective first and second end surfaces 111 and 112 thereof. Each of the leg portions 108 and 109 is provided with a concentrically aligned and longitudinally extending passage therethrough in order to accommodate the electrodes (not shown) as well as to permit dosing the finished arc tube 100 with filler material.

Figure 6:
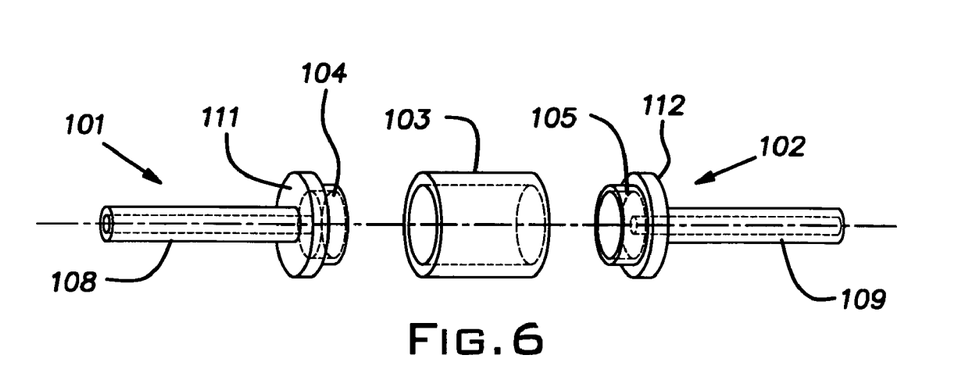
FIG. 6 shows a centerline exploded view of the portions of the arc tube of FIG. 5, after each has been molded but prior to joining them together.

As evident in FIG. 6, one method for making the arc tube 100 is by separately making or molding and then joining together a first end portion 101, a cylindrical center portion 103 and a second end portion 102. It will be seen that the first and second end portions 101 and 102 are substantially identical, and each comprises a respective first or second end surface 111 or 112 and a respective first or second leg portion 108 or 109. Each of the end portions 101 and 102 also includes a longitudinally extending circular flange 104,105 that extends from the face of the end surface 111,112 opposite the associated leg portion 108,109. The flange 104,105 has a smaller diameter than the end surface 111,112 and is dimensioned to provide an interference fit within the inner surface of the cylindrical center portion 103 when assembled prior to final curing, e.g., in an oven. The center portion 103 is made via conventional die extrusion techniques as are well known and understood in the art. Each of the end portions 101 and 102 is made according to the invention via an injection molding technique using the reciprocating mold shown in FIG. 7.

Figure 7:
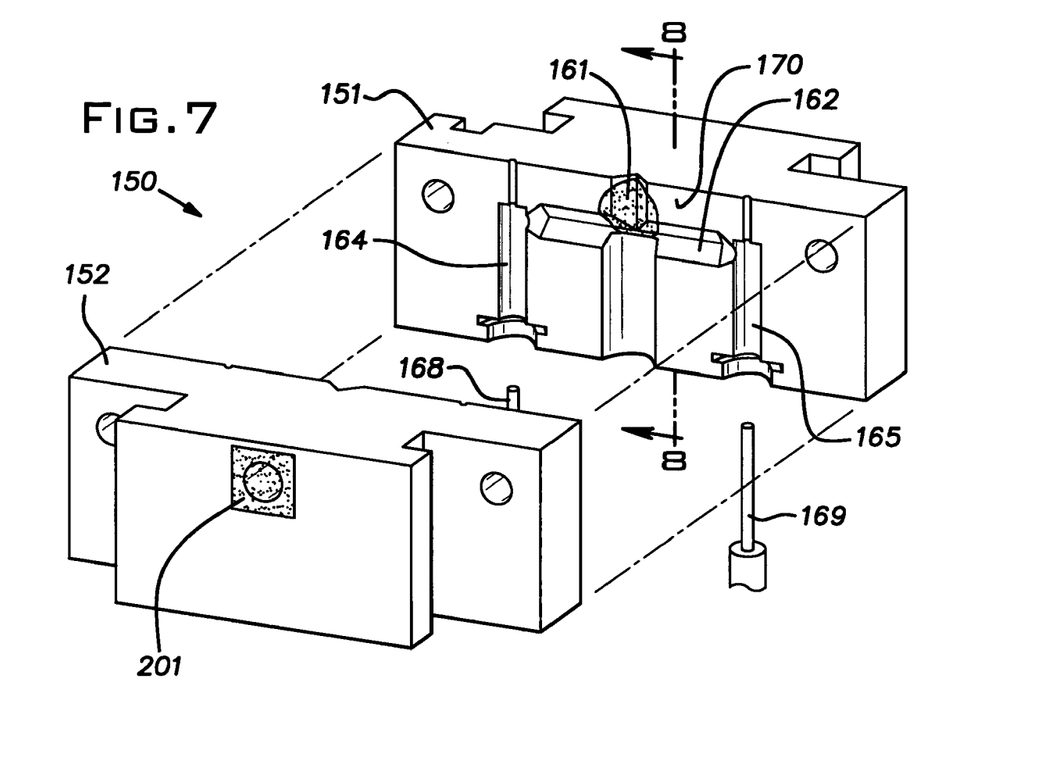
FIGS. 7-9 show different views of a reciprocating mold according to the invention for making reciprocating end portions of ceramic arc tubes useful in arc discharge lamps.

In FIG. 7, the reciprocating mold 150 for making the end portions 101 and 102 is shown, having a first reciprocating mold half 151 and a second reciprocating mold half 152. By reciprocating, it is meant that the mold halves 151 and 152 are reversibly moveable toward and away from one another into respective closed and open positions. In the closed position, opposing mold halves 151 and 152 are brought into contact thereby defining substantially continuous molding cavities between opposing pairs of first and second molding cavity halves 164 and 165 provided in the opposing first and second mold halves 151 and 152 as further described below. In the open position, the mold halves 151 and 152 are separated from one another thus permitting removal of molded greenware end portions 101 and 102 following a molding operation.

For brevity, the following description is provided with respect only to the first mold half 151, with the understanding that the second mold half 152 is similarly provided except for being a mirror image of the first mold half 151. In a preferred embodiment, the mold 150 is designed to mold two end portions 101,102 simultaneously in that it includes two molding cavities as will be evident from FIG. 7 and the following description. Mold half 151 has an injection runner 161 that cooperates with an opposing injection runner provided in the second mold half 152 to provide an injection port for a ceramic molding compound when the mold halves 151 and 152 are in the closed position. The injection runner 161 extends from an outer surface of the mold half toward, and forms a "T" in fluid communication with, a laterally extending runner 162. The laterally extending runner 162 extends laterally in either direction from the injection runner 161 toward laterally disposed, longitudinally extending molding cavity halves 164 and 165 (first pair of molding cavity halves in the first mold half 151, and an opposing second pair of molding cavity halves in the second mold half 152). As will be evident from FIG. 7, the laterally extending runner 162 provides fluid communication between the longitudinally extending injection runner 161 and each of the respective pair of molding cavity halves 164 and 165 for delivery of ceramic molding compound therein prior to each molding operation.

Each molding cavity half 164,165 has or defines a molding cavity surface contour corresponding or complementary to the desired exterior surface geometry of the desired end portion 101,102. In particular, each molding cavity half 164,165 has a first cylindrical portion whose length and diameter correspond to the exterior dimensions of leg portion 108,109, and a second portion whose surface contour corresponds to and provides the exterior surface geometry for both the end walls 111,112 and the circular flanges 104,105.

Figure 8:
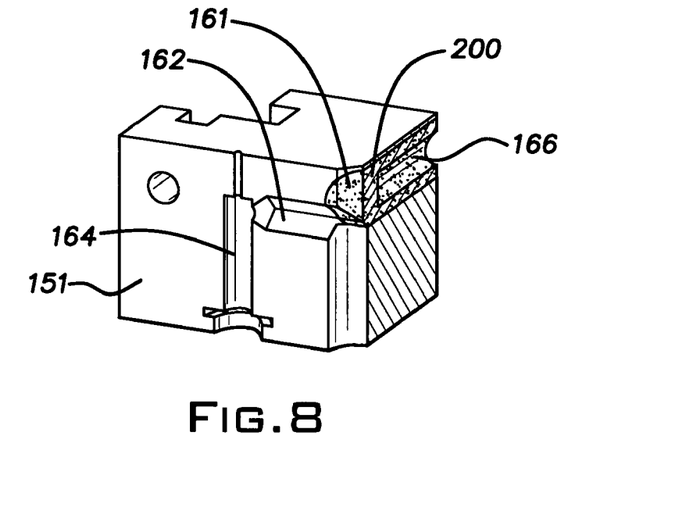
Figure 9:
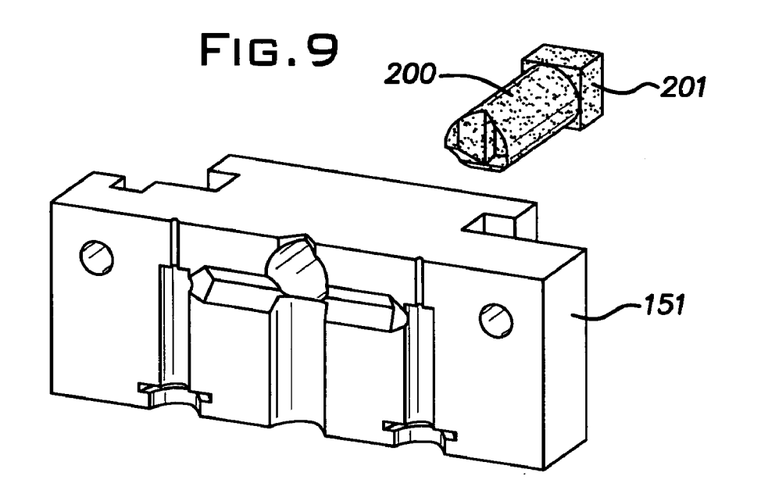

FIG. 8 shows a portion of the first mold half 151 sectioned along line 8-8 in FIG. 7. As most clearly seen in FIG. 8, the mold half 151 is provided with a porous metal insert 200 extending through the mold half wall from the facing surface 170 at the location of the injection runner 161. The insert 200 extends from the location of the injection runner 161 in the facing surface 170, through the mold half 151 and to an outer surface of the mold half 151 located opposite the facing surface 170. The porous metal insert 200 is machined at its end located at the facing surface 170 to conform to that surface and also to conform to and provide at least a portion of the injection runner 161 therein similarly as described hereinabove. In a preferred embodiment as shown in FIGS. 8-9, the metal insert 200 is provided as a substantially cylindrical body having a concentrically drilled and tapped blind bore 166 open at the end located at the outer surface of the mold half 151. The bore 166 is threaded and adapted to couple to a threaded male fitting for attachment to tubing to deliver mold release agent through the insert 200 to be secreted at the inner surface of the injection runner 161. Optionally, as shown in FIG. 9 the insert 200 can have a non-cylindrical end portion 201 whose shape is adapted to be received and seated within a complementarily shaped cavity provided in the outer surface of the mold half 151 through which the metal insert 200 can be inserted.

In operation, the first and second mold halves 151 and 152 are reciprocated into the closed position, thereby defining complete first and second molding cavities between the opposing first and second pairs of molding cavity halves 164 and 165. With the mold halves 151 and 152 closed, first and second center pins 168 and 169 are inserted and positioned concentrically through and within the respective first and second molding cavities, thereby defining an annular molding space between each pin 168,169 and the associated molding cavity surface for molding the end portions 101,102. The pins 168 and 169 are dimensioned and positioned to provide and define the concentrically aligned and longitudinally extending passages through the end portions 101,102 for accommodating the electrodes. Once the pins 168,169 are in position, a ceramic molding compound, typically comprising an alumina-binder mixture, is injected through the injection port defined between the opposing injection runners 161. The molding compound flows through the longitudinally extending injection port and is delivered to the laterally extending channel defined between the opposing laterally extending runners 162, then subsequently to the annular molding spaces defined between the respective pins 168,169 and the associated molding cavity surfaces. On application of heat the molding compound disposed in the laterally extending channel and in the molding cavities hardens to green strength. Subsequently, the mold halves 151 and 152 are separated, the pins 168 and 169 are withdrawn and the greenware ceramic parts are removed.

Figure 10:
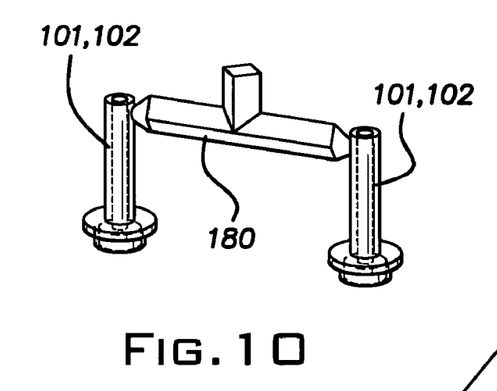
FIG. 10 shows a demolded assembly produced from the mold of FIGS. 7-9, including a pair of greenware arc tube end portions joined by a laterally extending molded element.

From the description in the preceding paragraph, it will be evident that on removal from the mold, the parts are provided in an assembly similar to that shown in FIG. 10, where a pair of greenware end portions 101,102 are joined or attached by a laterally extending element 180 that is an artifact resulting from the hardening of molding compound in the laterally extending channel of the mold 150. In practice, the greenware end portions 101 and 102 simply are broken off from this element 180 which can be discarded or otherwise recycled. After the greenware assembly (end portions 101,102 and element 180) is removed from the mold, the mold halves 151 and 152 are brought back into the closed position and the cycle can be repeated.

It has been found that the Porcerax II® material described above in both the 7 and the 20 micron average pore diameters performs well in the mold and method described immediately above for making the end portions 101,102 of an arc tube 100. It is desirable that the porous metal insert according to the invention be provided having an average pore diameter of at least about 7 microns. Metal inserts having average pore diameters smaller than 7 microns also can be used, but may require additional fluid pressure to pump the mold release agent through the porous network of the insert. Also, metal inserts having average pore diameters larger than 20 microns can be used. It is noted that when the porous metal insert is used to provide a portion of the inner surface of the molding cavity (e.g. at a sticking region 50 as described above), it must be considered that the larger the pore diameter for the metal insert the less glossy and more textured the surface of the molded part will be adjacent the inner surface portion of insert. This consideration should be taken into account when selecting an average pore diameter for a porous metal insert that will be used to provide a mold release agent coating to the inner surface of a molding cavity; obviously this consideration is less important when the insert will be used to provide a mold release agent at the inner surface of an injection port as in the mold shown in FIGS. 7-9.

By the present invention, a precisely metered quantity of mold release agent can be applied through the porous metal inserts 200 to the inner surface of the injection runners 161 at desirable or periodic intervals in order to alleviate or substantially eliminate the build up of ceramic molding compound in these runners 161. This has substantially improved throughput as well as the consistency and quality of arc tube end portions 101 and 102 made according to this method. It has been observed that through application of a suitable and precisely machine-metered quantity of mold release agent to the injection runners 161 at periodic intervals between molding operations, the incidence of molding compound build up in the runners has been substantially reduced or eliminated. Also, an increase in throughput has been realized because it no longer is necessary for an operator manually to clear away clogging debris from the injection runners between successive molding operations. In addition, the sporadic incidence of ruined or damaged parts also has been greatly reduced or eliminated due to the reproducible consistency with which a precisely metered quantity of mold release agent can be applied according to the present invention, at precisely the desired location to provide a well defined and reproducibly thick mold release film.

Figure 11:
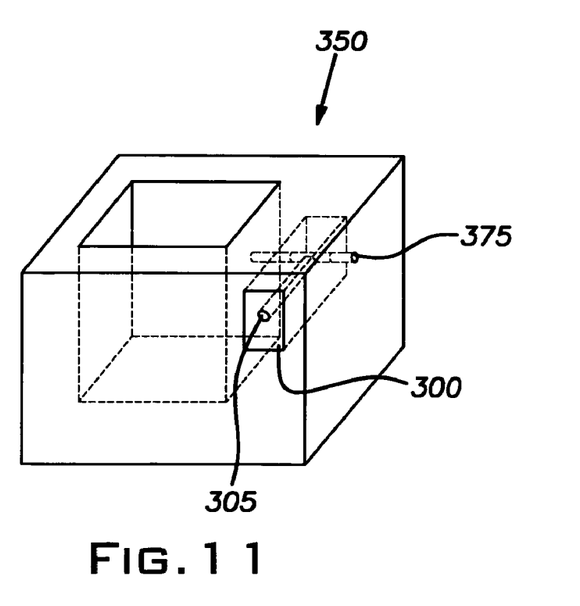
FIG. 11 shows a mold according to a further embodiment of the present invention.

The foregoing description has been concerned primarily with respect to providing a porous metal insert 55,200 in a mold half in order to deliver a metered quantity of mold release agent to the surface of an injection runner 32,161 located in the facing surface 42,170 of a mold half 12,151. However, it will be understood the invention is not to be correspondingly limited. For example, an injection port can be provided as a through bore through the wall of a mold, such as a ceramic part mold, instead of being provided and defined between opposing injection runners disposed in opposing mold halves. In this embodiment, a porous metal insert can be provided and disposed through the mold wall such that at least a portion of the injection port (through bore) inner surface is provided or defined by the porous insert. In this embodiment, the porous insert extends from the inner surface of the injection port similarly as described above, and can be provided with a drilled and tapped blind bore open to the exterior of the mold in order to accommodate a complimentarily male threaded blind bore 305 to couple to a complimentarily threaded fitting for delivery of mold release agent to and through the insert. For example, as shown in FIG. 11 a mold can be prepared by first providing a porous metal insert 300 in the wall of a mold 350, and then drilling a through-bore through the wall and a portion of the insert to provide the injection port 375. Once the port 375 has been drilled, the insert 300 can be removed for cleaning and to reestablish the surface porosity at the drilled surface, and then re-installed in the mold wall.

The identity and composition of the mold release agent is not of particular importance to the present invention, so long as it will flow through the porous network of the porous metal insert according (to the invention; i.e. it should not be a solid, or if it comprises a solid material, then solids should be in the form of particles having a mean particle size substantially smaller than the mean pore diameter for the porous metal insert to avoid clogging the pore structure, and they should be suspended in a suitable liquid carrier. Solids-containing mold release agents are less preferred due to the potential to clog the porous network of the porous metal insert.

The mold release agent typically will be selected based on criteria such as the composition of the particular molding compound to be used and its compatibility with certain release agent ingredients. While the present description has been provided primarily with respect to a ceramic molding compound such as an alumina and/or silica containing compound it will be understood by persons of ordinary skill in the art that the invention has analogous application to molding (including injection molding) using other common or conventional materials used for molding, such as thermoplastic and thermoset precursor molding compositions or compounds, polymeric or prepolymer molding compounds which can be unitary or binary liquids as known in the art, as well as other molten materials used for molding such as molten metals, plastics, etc. Generally, the invention will provide utility as described herein to a wide variety of molding operations using various molding materials where it is desirable to apply a precisely metered quantity of a mold release compound at a precisely selected location along the inner surface of a mold cavity or injection port. Obviously, the choice and composition of the particular mold release agent will depend on the molding compound identity and composition based at least on considerations described in the preceding, this and the following paragraphs.

It is to be noted that when the metal insert herein described is provided at an injection port to supply mold release agent to the surface thereof, the shot of molding compound through the injection port will carry a portion of the mold release agent with it and ultimately into the molding cavity. Thus, the mold release agent should be selected taking this into account, and particularly what effect the mold release agent will or may have on the release characteristics, surface gloss, etc., of the greenware molded parts. Selection of appropriate mold release compounds and compositions of them is not within the scope of the present invention, and further is well within the ability of a person having ordinary skill in the art without undue experimentation. Typically, release agents include silanes or silicone-based compounds that are liquids at operating temperatures, or mixtures of these with or without other conventional additives.

The present invention presents a significant improvement to molds and to methods of molding, particularly for high volume or high throughput molded parts. By providing a portion of the injection port surface (or of a sticking region along the molding cavity surface) in or as part of a porous metal insert, a precisely metered quantity of mold release agent can be applied at these surfaces at desirable times or intervals to ameliorate or eliminate problems of clogging the port, or of greenware parts sticking to the mold. This can be done without the need for manual operator intervention, for example to wipe on or swab these surfaces with a release agent. Consequently, the efficiency and efficacy of a high throughput molding process no longer is susceptible to inconsistencies of mold release coating, and of product throughput and quality that are inherent in such manual applications due to variances in operator techniques. That is not to say, however, that the present invention contemplates or requires that surfaces treated or provide by the porous metal insert never be manually cleaned. For example, manual cleaning of these surfaces is contemplated during a period when the release agent composition, delivery rates and intervals, etc., are being optimized (when the agent may not yet be as effective as desired), as well as during or as part of a regular or routine maintenance schedule for the mold, which can be at any desirable interval depending on the process conditions, e.g., every hour, day, week, month, etc., or otherwise as needed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A mold comprising a molding cavity defined within said mold, an injection port having an inner surface defining a passageway through a wall of said mold for injecting a molding compound into said molding cavity, and a porous metal insert provided in said wall of said mold, a portion of said porous metal insert being located at and providing at least a portion of said inner surface of said injection port and another portion of said porous metal insert being located at an outer surface of said mold.

2. A mold according to claim 1, said metal insert having a bore hole open to an exterior of said mold.

3. A mold according to claim 2, said bore hole being a threaded blind bore.

4. A mold according to claim 3, said threaded blind bore being in the configuration of a threaded female fitting that is adapted to couple to a complimentarily threaded male fitting.

5. A mold according to claim 1, said porous metal insert having a void fraction of at least 20 percent.

6. A mold according to claim 1, said porous metal insert having an average pore diameter of at least about 7 microns.

7. A mold according to claim 1, said porous metal insert having an average pore diameter of 20 microns.

8. A mold according to claim 1, said porous metal insert being substantially cylindrical in shape, and being received and accommodated in a substantially cylindrical bore through said wall of said mold.

9. A mold according to claim 1, comprising a pair of opposing first and second mold halves, said mold halves comprising
respective and opposing first and second facing surfaces that face the opposing mold half in a closed position of said first and second mold halves,
respective and opposing first and second molding cavity halves provided in said first and second mold halves, each of said molding cavity halves being open to the associated first or second facing surface, and respective and opposing first and second injection runners provided in the respective first and second facing surfaces and extending between the associated molding cavity half at one end and an outer surface of the respective mold half at the other end, wherein, in the closed position of said first and second mold halves, said first and second molding cavity halves cooperate to provide and define said molding cavity within said mold, and said first and second injection runners cooperate to define said injection port, and wherein said porous metal insert is provided in a wall of said first mold half, said porous metal insert having an inner surface portion located at said first facing surface, at least a portion of said first runner being provided in said inner surface portion of said porous metal insert.

10. A mold according to claim 9, said inner surface portion of said porous metal insert being machined to provide said portion of said first runner therein.

11. A mold according to claim 10, said inner surface portion of said porous metal insert being further machined to conform to and provide a substantially continuous portion of said first facing surface at a location adjacent said first runner.

12. A mold according to claim 9, said porous metal insert having a void fraction of at least 20 percent.

13. A mold according to claim 9, said porous metal insert having an average pore diameter of at least about 7 microns.

14. A mold according to claim 9, wherein a second porous metal insert is provided in said second mold half, said second porous metal insert having a second inner surface portion located at said second facing surface, at least a portion of said second runner being provided in said second inner surface portion of said second porous metal insert.

15. A mold according to claim 14, said second inner surface portion of said second porous metal insert being machined to conform to and provide a substantially continuous portion of said second facing surface, and to provide said portion of said second runner therein.

16. A mold according to claim 14, said second porous metal insert having a void fraction of at least 20 percent.

17. A mold according to claim 14, said second porous metal insert having an average pore diameter of about 3 to about 20 microns.

18. A mold for an end portion of a ceramic arc tube for a discharge lamp, said mold comprising reciprocating first and second mold halves, said mold halves comprising respective and opposing first and second facing surfaces that face the opposing mold half in a closed position of said first and second mold halves, respective and opposing first and second injection runners provided in the respective first and second facing surfaces and extending in a substantially longitudinal direction from an outer surface of the respective mold half;

respective and opposing first and second laterally extending runners provided in the respective first and second facing surfaces, each of said first and second injection runners extending to and being in fluid communication with the associated laterally extending runner, each of said laterally extending runners extending laterally in either direction from the associated injection runner toward respective and opposing first and second pairs of laterally disposed and longitudinally extending molding cavity halves;

wherein, in the closed position of said first and second mold halves, said first and second injection runners cooperate to define an injection port through a wall of said mold, said first and second laterally extending runners cooperate to define a laterally extending channel in fluid communication with said injection port, and said first pair of molding cavity halves cooperate with said second pair of molding cavity halves to define a pair of complete molding cavities located on either side of and in fluid communication with said laterally extending channel;

and wherein a porous metal insert is provided in a wall of said first mold half, said porous metal insert having an inner surface portion located at said first facing surface, at least a portion of said first runner being provided in said inner surface portion of said porous metal insert, and another portion of said porous metal insert being located at an outer surface of said mold.

19. A mold according to claim 18, said inner surface portion of said porous metal insert being machined to conform to and provide a substantially continuous portion of said first facing surface, and to provide said portion of said first runner therein.

20. A mold according to claim 18, said porous metal insert having a void fraction of at least 20 percent.

21. A mold according to claim 18, said porous metal insert having an average pore diameter of at least about 7 microns.

22. A mold according to claim 18, said metal insert having a bore hole open to an exterior of said mold.

23. A mold according to claim 22, said bore hole being a threaded blind bore.

24. A mold according to claim 23, said porous metal insert extending from the location of said first injection runner in said first facing surface, through said wall of said first mold half to a location at or adjacent an outer surface of said first mold half, and there being provided with a threaded blind bore open to an exterior of said mold.

* * * * *